(No Model.) 3 Sheets—Sheet 3.

R. H. PLASS.
SELF PROPELLING VEHICLE.

No. 583,154. Patented May 25, 1897.

Witnesses
N. C. Kelly
A. C. Townsend

Reuben H. Plass. Inventor
By his Attorney
David H. Mead

UNITED STATES PATENT OFFICE.

REUBEN H. PLASS, OF BROOKLYN, NEW YORK.

SELF-PROPELLING VEHICLE.

SPECIFICATION forming part of Letters Patent No. 583,154, dated May 25, 1897.

Application filed April 20, 1895. Serial No. 546,557. (No model.)

*To all whom it may concern:*

Be it known that I, REUBEN H. PLASS, a citizen of the United States, residing at Brooklyn, in the county of Kings and State of New York, have invented certain new and useful Improvements in Self-Propelling Vehicles; and I do hereby declare the following to be a full, clear, and exact description of the invention, such as will enable others skilled in the art to which it appertains to make and use the same.

This invention relates to self-propelling vehicles.

The object of the invention is to produce a self-propelling vehicle which shall be provided with an engine contained in small compass and capable of propelling the vehicle at varying rates of speed.

Further, the object of the invention is to produce a vehicle of the kind referred to having its front or guiding wheels so arranged and capable of such manipulations as to enable the vehicle to be turned in small space.

With these objects in view the invention consists of a vehicle constructed substantially as hereinafter described, and particularly pointed out in the claim.

The invention is illustrated in the accompanying drawings, in which—

Figure 1:
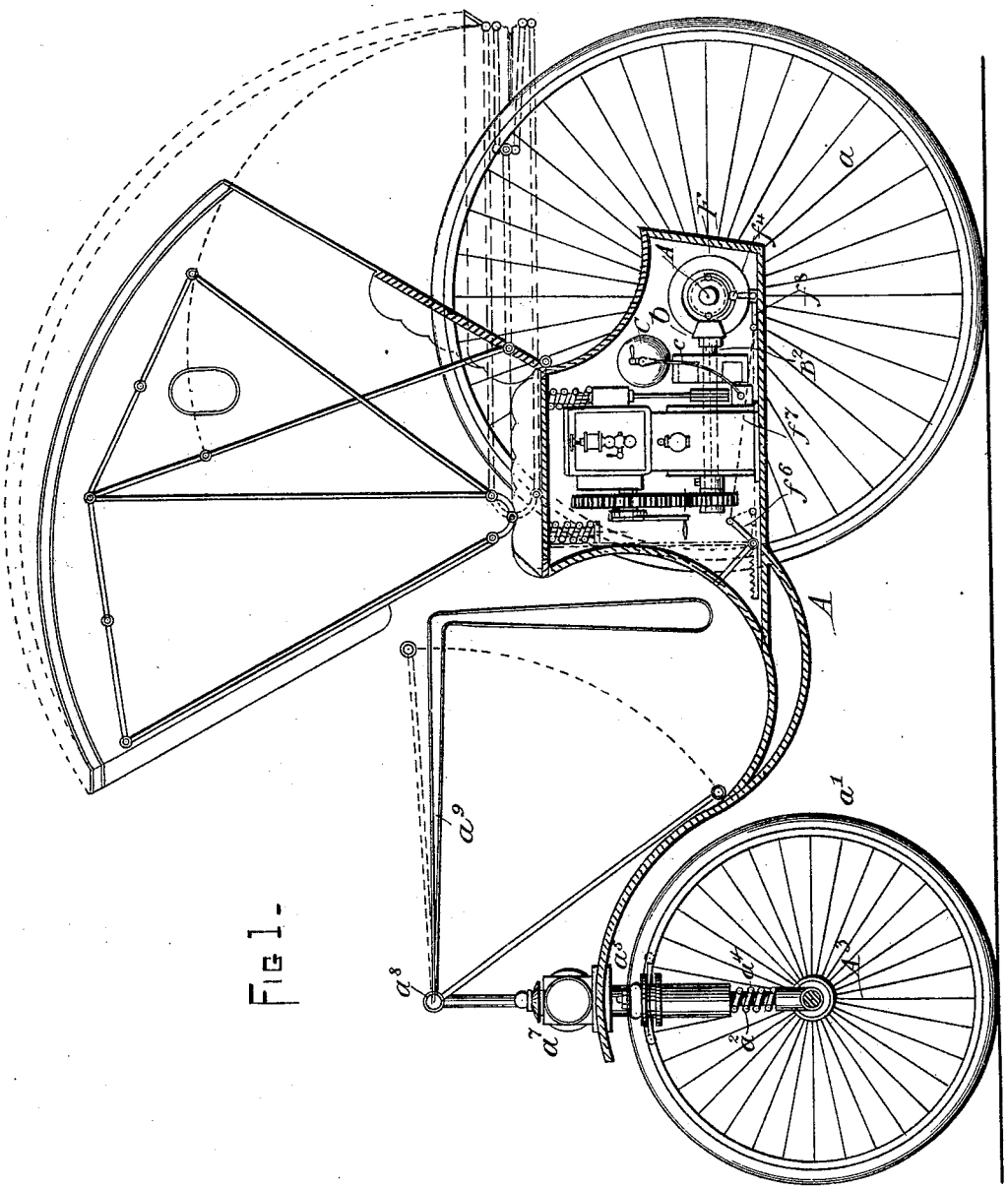
Figure 2:
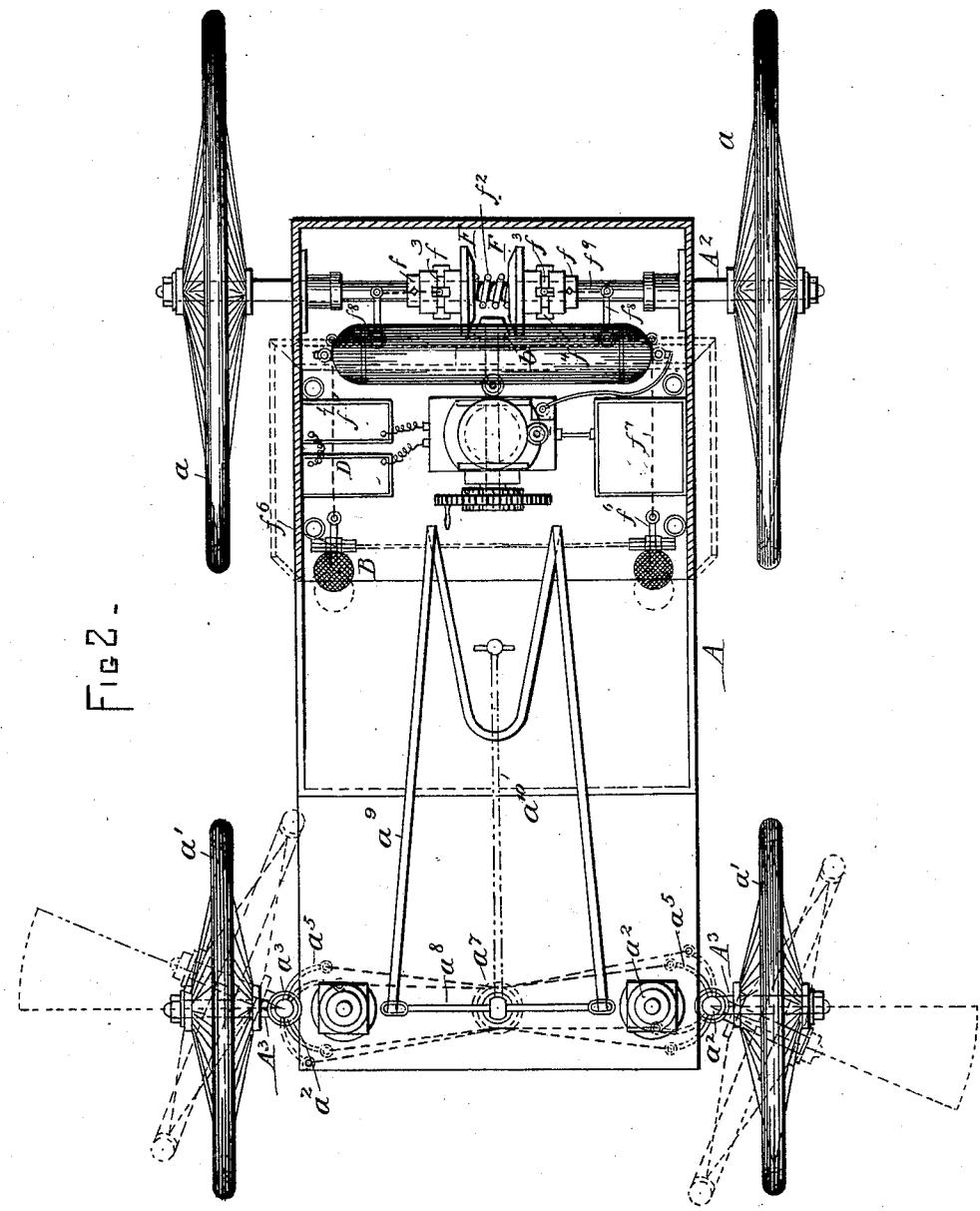
Figures 3, 4:
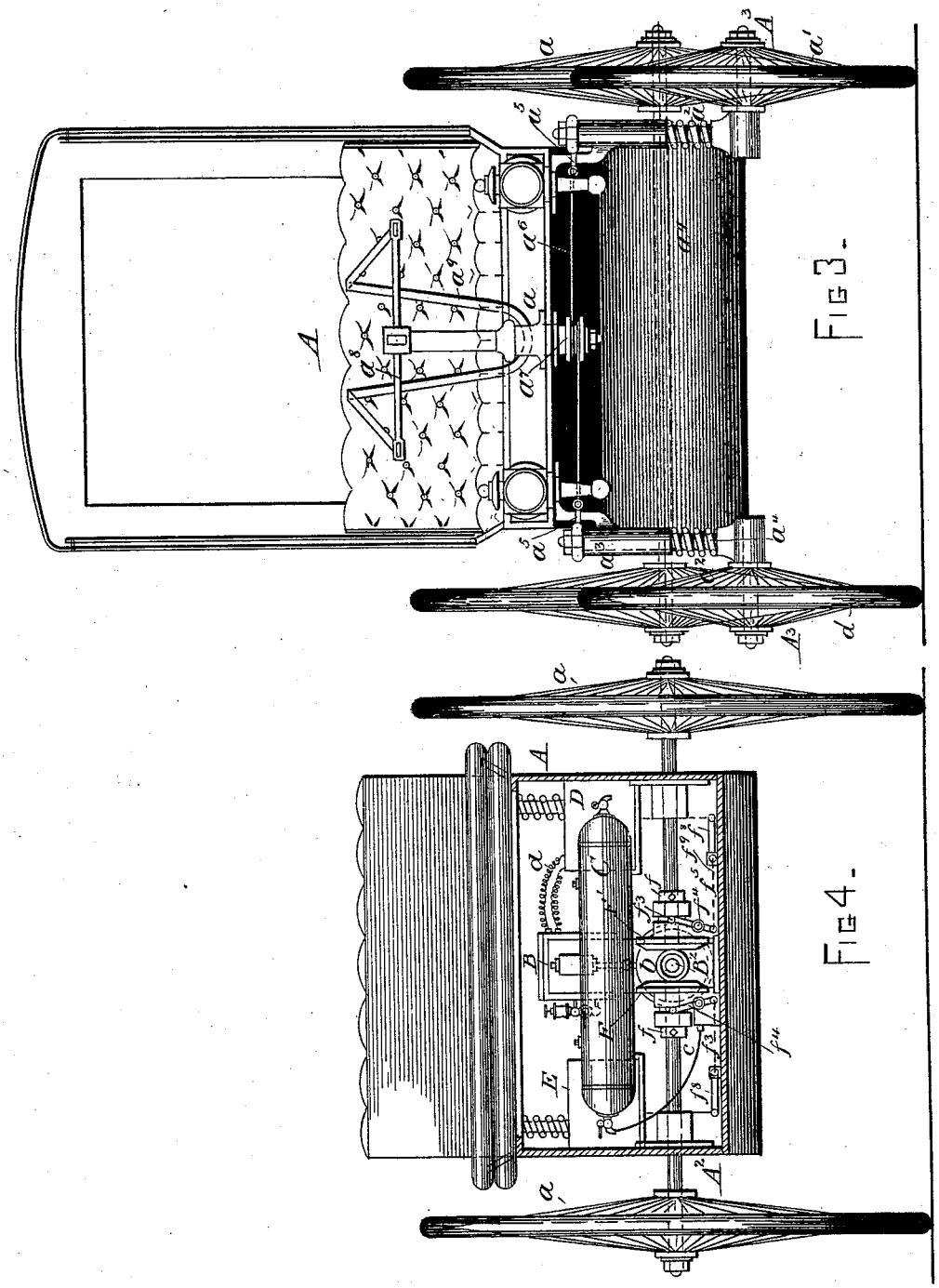

Figure 1 is a side elevation of the vehicle, the side of the body being removed in order to show the interior arrangements of the parts. Fig. 2 is a plan view, the front wheels being shown in dotted lines in the position assumed in turning the vehicle to the right. Fig. 3 is a front view; and Fig. 4 is a rear view, the rear portion of the body being removed.

In the drawings, A represents the body of the vehicle, which is shown as supported on four wheels, the rear wheels $a$ being, as shown, mounted on a fixed axle $A^2$ and rigidly attached thereto. The front wheels $a'$ are mounted on short axles $A^3$, which are provided with vertical projections $a^2$, which are received by sleeves $a^3$, rigidly secured to the body of the vehicle. Interposed between the axles $A^3$ and the sleeves are coil-springs $a^4$, upon which the weight of the forward part of the vehicle comes. The vertical portions $a^2$ are provided with cross-pieces $a^5$, and to the ends of each of these cross-pieces are connected chains, ropes, or the like, $a^6$, which pass around a standard $a^7$ in the center of the forward part of the vehicle. This standard $a^7$ is provided with a cross-bar $a^8$, to which are attached straps $a^9$, or with a handle $a^{10}$, as shown in dotted lines in Fig. 2, by which the standard may be rotated. By this arrangement it will be seen that by rotating the standard in either direction motion will be transmitted to the axles through their upright portions $a^2$, and in this way the direction of the wheels and the direction of the movement of the vehicle may be regulated.

A propelling-power for the vehicle is provided by an engine B, which may be a gasolene, naphtha, or other similar engine. Arranged in the rear of the engine, and preferably beneath the seat of the vehicle, is a tank C, containing hydrocarbon and connected to the engine by a pipe $c$, through which the necessary supply is conveyed to the engine. The spark for igniting the charges of the hydrocarbon in the engine is furnished by a battery D, having wires $d$, connected with the engine.

At one side of the engine is arranged a water-tank E, which furnishes a circulation of water around the cylinder of the engine.

The main shaft $B^2$ of the engine is provided at its rear end with a friction-head $b$, through which power is communicated to friction-disks F F, connected to the rear axle $A^2$ of the vehicle in such way as to turn therewith and at the same time to have a sliding movement thereon.

The direction of movement and the speed of motion of the vehicle is regulated by the contact of the disks F F with the friction-head $b$.

The outward movements of the friction-disks are regulated by collars $f$. Fixed to the rear axle and arranged between the friction-disks is a coil-spring $f^2$, the tendency of which is to force them apart. Each friction-disk is provided with a shank having a circumferential groove $f^3$, into which project levers $f^4$. The movement of these levers or their pivots $f^5$ regulates the contact of the friction-disks with the friction-head on the engine-shaft. Motion is given the levers $f^4$ through levers $f^6$, pivotally mounted on the floor of the vehicle adjacent to the seat. These levers are connected by chains or ropes $f^7$ to bell-crank levers $f^8$ to the levers $f^4$. By this it will be seen that by pressing on one or the other of the levers $f^6$ the corresponding friction-disk F will be brought into contact with the friction-head $b$. The direction of movement is determined by pressing one or the other of the friction-disks, and the speed may be governed by regulating the pressure on the levers $f^6$.

Having thus described my invention, what I claim as new, and desire to secure by Letters Patent, is—

A self-propelling vehicle having an engine mounted thereon, an engine-shaft having a friction-head, an axle having supporting-wheels rigidly attached thereto, disks mounted on the axle on opposite sides of the friction-head and provided with reduced portions having circumferential grooves levers mounted adjacent to the disks and projecting into the grooves, levers mounted on the floor of the vehicle in a position to be pressed by the occupant of the vehicle, and connections between the respective levers, substantially as described.

In testimony whereof I affix my signature in presence of two witnesses.

REUBEN H. PLASS.

Witnesses:
THOS. S. HOPKINS,
F. H. SMITH.